US 8,709,287 B2

(12) United States Patent
Peng et al.

(10) Patent No.: US 8,709,287 B2
(45) Date of Patent: Apr. 29, 2014

(54) WATER PURIFICATION USING ENERGY FROM A STEAM-HYDROCARBON REFORMING PROCESS

(71) Applicant: Air Products and Chemicals, Inc., Allentown, PA (US)

(72) Inventors: Xiang-Dong Peng, Orefield, PA (US); Geoffrey Colling Achilles, Allentown, PA (US); Blaine Edward Herb, New Tripoli, PA (US); Eric Howard Klingenberg, Emmaus, PA (US); Derek Miller, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/858,363

(22) Filed: Apr. 8, 2013

(65) Prior Publication Data

US 2013/0309163 A1    Nov. 21, 2013

Related U.S. Application Data

(60) Provisional application No. 61/648,662, filed on May 18, 2012.

(51) Int. Cl.
*C01B 3/38* (2006.01)
*C01B 3/24* (2006.01)
*C01B 3/26* (2006.01)

(52) U.S. Cl.
CPC ......................... *C01B 3/26* (2013.01)
USPC ........................... 252/373; 423/650

(58) Field of Classification Search
CPC ......................................................... C01B 3/38

USPC ............................................................ 252/373
See application file for complete search history.

(56) References Cited

U.S. PATENT DOCUMENTS

| 3,399,118 | A | 8/1968 | Williamson |
| 3,412,558 | A | 11/1968 | Starmer |
| 3,479,820 | A | 11/1969 | Rutenberg |
| 3,597,328 | A | 8/1971 | Michels |
| 3,691,020 | A | 9/1972 | Hughes |
| 3,875,017 | A | 4/1975 | Saari et al. |
| 4,338,199 | A | 7/1982 | Modell |
| 5,421,962 | A | 6/1995 | Shvarts et al. |
| 5,441,548 | A | 8/1995 | Brandl et al. |
| 7,377,951 | B2 | 5/2008 | Pham et al. |
| 7,988,948 | B2 | 8/2011 | Guvelioglu |
| 8,387,545 | B2 | 3/2013 | Latimer et al. |
| 8,430,947 | B2 | 4/2013 | Latimer et al. |
| 2004/0038089 | A1 | 2/2004 | Hoffjann et al. |
| 2007/0246345 | A1 | 10/2007 | Leveson et al. |
| 2009/0117024 | A1 | 5/2009 | Weedon et al. |

(Continued)

FOREIGN PATENT DOCUMENTS

| CA | 2190299 | 11/1996 |
| DE | 102 16 709 B4 | 4/2003 |
| EP | 0142214 | 5/1985 |

(Continued)

*Primary Examiner* — Melvin C Mayes
*Assistant Examiner* — Kenneth Vaden
(74) *Attorney, Agent, or Firm* — Bryan C. Hoke, Jr.

(57) ABSTRACT

A process for producing a $H_2$-containing product gas and purified water from an integrated catalytic steam-hydrocarbon reforming and thermal water purification process. Raw water, such as salt water, is heated by indirect heat transfer with reformate from the catalytic steam reforming process for purifying raw water in one of a multiple effect distillation process and a multi-stage flash process.

17 Claims, 4 Drawing Sheets

(56) References Cited

U.S. PATENT DOCUMENTS

| | | |
|---|---|---|
| 2011/0147195 A1 | 6/2011 | Shapiro et al. |
| 2011/0162952 A1 | 7/2011 | Conchieri et al. |
| 2012/0055776 A1 | 3/2012 | Feher |

FOREIGN PATENT DOCUMENTS

| | | |
|---|---|---|
| EP | 1921281 | 10/2007 |
| GB | 754745 | 8/1956 |
| GB | 2443802 | 5/2008 |
| WO | 2004103896 | 12/2004 |
| WO | 2007149879 A2 | 12/2007 |

WATER PURIFICATION USING ENERGY FROM A STEAM-HYDROCARBON REFORMING PROCESS

CROSS-REFERENCE TO RELATED APPLICATIONS

This patent application claims priority from Provisional Application Ser. No. 61/648,662, titled "Salt Water Desalination Using Energy from Steam-Hydrocarbon Reforming Process", filed on May 18, 2012, the contents of which are hereby incorporated by reference.

BACKGROUND

Purification of water, such as thermal desalination of salt water using multi-stage flash (MSF) or multiple effect distillation (MED), is a process that receives heat from a low pressure, high quality steam energy source. In this process, low pressure steam is generated with common boiler technology (see, for example, U.S. Pat. Nos. 4,338,199 and 5,441,548).

It is known to use other forms of energy for desalination. For example, U.S. Pat. No. 5,421,962 utilizes solar energy for desalination processes, U.S. 2011/0162952 utilizes energy from a gasification process, and U.S. 2011/0147195 uses waste heat from a power generation plant for the desalination process.

Industry desires to utilize waste heat from catalytic steam-hydrocarbon reforming processes. Catalytic steam-hydrocarbon reforming processes release a large amount of waste heat under various circumstances. One circumstance is when the energy cost is low and less capital is spent on heat recovery. Another circumstance is when the process does not produce a large amount of high pressure export steam due to the lack of demand for export steam. Low or zero export steam production reduces the heat sink for the process, resulting in a large amount of waste heat.

Industry desires to produce purified water in water-stressed regions. The water can be used as make-up water in the catalytic steam-hydrocarbon reforming process, making the process self-sufficient with regard to water. Water can also be sold as a product for industrial and municipal use.

Industry desires to reduce or eliminate water treatment cost in a catalytic steam-hydrocarbon reforming plant. Currently, make-up water needs to be treated in a catalytic steam-hydrocarbon reforming plant so that it meets the requirements for the boiler feed water. These treatments include filtration to remove particulates, demineralization to remove minerals, and deaeration to remove soluble gases such as $O_2$ and $CO_2$.

Industry desires to reduce the capital and energy cost of the catalytic steam-hydrocarbon reforming process. The thermal efficiency of catalytic steam-hydrocarbon reforming processes depends on the utilization of low level heat. When the energy cost is high, more low level heat is recovered for better thermal efficiency or lower energy cost. However, recovering more heat means using more and/or larger heat exchangers, resulting in higher capital cost. In contrast, when the energy cost is low, the capital cost for heat exchangers is minimized with the sacrifice of thermal efficiency or energy cost.

BRIEF SUMMARY

The present invention relates to a process for producing a $H_2$-containing product and for producing purified water.

The present invention integrates the catalytic steam-hydrocarbon reforming process with a thermal water purification process.

This integration provides a low cost energy source for thermal water purification. This integration also provides a new heat sink (i.e. the heat for thermal water purification) and a high purity water source to the catalytic steam-hydrocarbon reforming process. The present invention uses this new heat sink and the high purity water source to reconfigure the syngas heat recovery system, simplify the water treatment system, and rebalance the steam and shaft work production of the catalytic steam-hydrocarbon reforming process, thereby fulfilling the above-mentioned industrial needs.

There are several aspects of the process as outlined below.

Aspect 1. A process comprising
(a) introducing a reformer feed gas mixture into a plurality of catalyst-containing reformer tubes in a reformer furnace, reacting the reformer feed gas mixture in a reforming reaction under reaction conditions effective to form a reformate comprising $H_2$, CO, $CH_4$, and $H_2O$, and withdrawing the reformate from the plurality of catalyst-containing reformer tubes;
(b) heating saturated boiler feed water from a steam drum by indirect heat transfer with the reformate withdrawn from the plurality of catalyst-containing reformer tubes in a first heat exchanger thereby forming high pressure steam having a pressure ranging from 1.5 to 12.5 MPa (absolute), wherein the reformer feed gas mixture comprises the high pressure steam;
(c) heating boiler feed water by indirect heat transfer with the reformate from the first heat exchanger in a second heat exchanger and introducing the heated boiler feed water into the steam drum;
(d) reacting the reformate from the second heat exchanger in the presence of a shift catalyst under reaction conditions effective to form additional hydrogen in the reformate;
(e) heating raw water by indirect heat transfer with the reformate from step (d) thereby heating the raw water for purification thereof by a thermal water purification process to produce a purified water, and thereby cooling the reformate stream;
(f) heating make-up water by indirect heat transfer with the reformate from step (e) in a third heat exchanger thereby cooling the reformate to a temperature ranging from 25° C. to 65° C.;
(g) separating the reformate from step (f) to produce the $H_2$-containing product and a by-product gas; and
(h) combusting a fuel with an oxidant gas in the reformer furnace external to the plurality of catalyst-containing reformer tubes under conditions effective to combust the fuel to form a combustion product gas and generate heat to supply energy for reacting the reformer feed gas mixture inside the plurality of catalyst-containing reformer tubes, and withdrawing a combustion product gas from the reformer furnace.

Aspect 2. The process of aspect 1 wherein the raw water comprises salt water, the thermal water purification process is a desalination process, and the purified water is desalinated water.

Aspect 3. The process of aspect 1 or aspect 2 wherein the raw water comprises process condensate from a steam methane reforming process.

Aspect 4. The process of any one of aspects 1 to 3 wherein the raw water comprises at least one of river water, stream water, lake water, municipal recycled water, industrial recycled water, and groundwater.

Aspect 5. The process of any one of aspects 1 to 4 wherein the thermal water purification process is a multiple effect distillation process or a multi-stage flash process.

Aspect 6. The process of any one of aspects 1 to 5 wherein the make-up water comprises the purified water.

Aspect 7. The process of aspect 6 wherein the make-up water comprises the purified water without treating the purified water by filtration, demineralization, or deaeration Aspect 8. The process of any one of aspects 1 to 6 wherein the make-up water consists of the purified water.

Aspect 9. The process of aspect 8 wherein the make-up water consists of the purified water without treating the purified water by filtration, demineralization, or deaeration.

Aspect 10. The process of any one of aspects 1 to 9 wherein the reaction conditions effective to form the reformate in step (a) include a first temperature ranging from 500° C. to 1000° C. and a first pressure ranging from 203 kPa to 5,066 kPa (absolute).

Aspect 11. The process of any one of aspects 1 to 10 wherein the reaction conditions effective to form additional hydrogen in the reformate in step (d) include a second temperature ranging from 190° C. to 500° C. and a second pressure ranging from 203 kPa to 5,066 kPa (absolute).

Aspect 12. The process of any one of aspects 1 to 11 wherein the step of heating the raw water by indirect heat transfer does not include heating of an intermediate working fluid.

Aspect 13. The process of any one of aspects 1 to 11 wherein the step of heating raw water by indirect heat transfer comprises heating a working fluid by indirect heat transfer with the reformate from step (d), and heating the raw water by indirect heat transfer with the working fluid.

Aspect 14. The process of aspect 13 wherein the working fluid is water, wherein the working fluid water is evaporated to form a first stream of steam having a pressure ranging from 15.2 kPa to 304 kPa (absolute) when heated by the reformate from step (d), and wherein the first stream of steam is condensed when heating the raw water.

Aspect 15. The process of aspect 14 wherein the pressure of the first stream of steam ranges from 20.3 kPa to 132 kPa (absolute).

Aspect 16. The process of aspect 14 or aspect 15 wherein 0.05<X<1.2, where X is the ratio of the mass flow rate of the first stream of steam to the mass flow rate of the make-up water.

Aspect 17. The process of any one of aspects 14 to 16 wherein:
the water is evaporated to form a second stream of steam having a pressure ranging from 280 kPa to 608 kPa;
the reformate from step (d) heats the second stream of steam prior to heating the first stream of steam;
the second stream of steam is expanded in a steam turbine to generate shaft work prior to heating the raw water; and
the second stream of steam is condensed when heating the raw water.

Aspect 18. The process of aspect 17 wherein the pressure of the second stream of steam ranges from 280 kPa to 405 kPa.

Aspect 19. The process of any one of aspects 1 to 18 wherein the reformate is separated by pressure swing adsorption in step (g) to produce the $H_2$-containing product and the by-product gas.

Aspect 20. The process of any one of aspects 1 to 19 wherein the fuel combusted in step (h) comprises the by-product gas.

Aspect 21. The process of any one of aspects 1 to 19 further comprising:
heating boiler feed water by indirect heat transfer with the reformate from step (d) prior to heating the raw water by indirect heat transfer with the reformate from step (d) wherein the boiler feed water is heated by the reformate from step (d) before being heated in step (c); and
heating a hydrocarbon feedstock by indirect heat transfer with the reformate from step (e), wherein the reformer feed gas mixture comprises the hydrocarbon feedstock.

Aspect 22. The process of any one of aspects 1 to 21 further comprising:
expanding a portion of the high pressure steam in a steam turbine to generate shaft work;
heating the raw water by indirect heat transfer with the expanded steam from the steam turbine thereby heating the raw water for purification thereof in the thermal water purification process.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

As used herein, "first," "second," "third," etc. are used to distinguish from among a plurality of features and/or steps and does not indicate the relative position in time or space.

As used herein, the term "catalyst" refers to a support, catalytic material, and any other additives which may be present on the support.

As used herein a "divided portion" of a stream is a portion having the same chemical composition as the stream from which it was taken.

The term "depleted" means having a lesser mole % concentration of the indicated component than the original stream from which it was formed. "Depleted" does not mean that the stream is completely lacking the indicated component.

As used herein, "heat" and "heating" include both sensible and latent heat and heating.

As used herein, "raw water" is any impure water, for example, one or more of salt water (ocean water, seawater, brackish water), surface water such as a stream, river, or lake, groundwater, municipal/industrial reuse or recycled water, or waste water from an industrial process, such as rejected water from a steam methane reforming process such as the process condensate. The process condensate is the water condensed from the syngas stream of the SMR process. Raw water is generally less pure than conventional industrial feed water, such as potable water.

As used herein, "purified water" means any distilled water (i.e. distillate or condensed water) from a thermal water purification process.

The present invention relates to a process for producing a $H_2$-containing product and for producing purified water. The $H_2$-containing product may be a purified $H_2$ product gas or a synthesis gas having a desired $H_2$:CO molar ratio. The purified water may be desalinated water, i.e. purified water from salt water. For the purposes of the present disclosure, "desalinated water" means water from which 99-100 wt % of salt originally present has been removed.

The present invention relates to heat integration between a catalytic steam-hydrocarbon reforming process and thermal water purification. The catalytic steam-hydrocarbon reforming process uses a large amount of water for reaction (e.g. $CH_4+H_2O \rightarrow 4H_2+CO_2$) and production of high pressure steam as a co-product. The process also produces a large amount of low level heat. Thermal water purification produces purified water from raw water, and its energy source is low level heat. These two processes complement each other in that catalytic steam-hydrocarbon reforming consumes water and generates low level heat, whereas thermal water purification consumes low level heat and generates water. The present invention exploits this good match and achieves reduction in the total capital and energy cost of the integrated process.

A thermal purification process as used herein is any process that uses a heat source to evaporate raw water and condenses the evaporated water vapor into a condensate or distillate (i.e. the purified water). The thermal water purification process may be, for example, a known commercial thermal desalination process such as multi-stage flash (MSF) or multiple effect distillation (MED).

Catalytic steam-hydrocarbon reforming has heretofore not been integrated with thermal water purification, even though catalytic steam-hydrocarbon reforming produces a large amount of low level heat. No specific integration schemes have been disclosed up to now.

Figure 1:
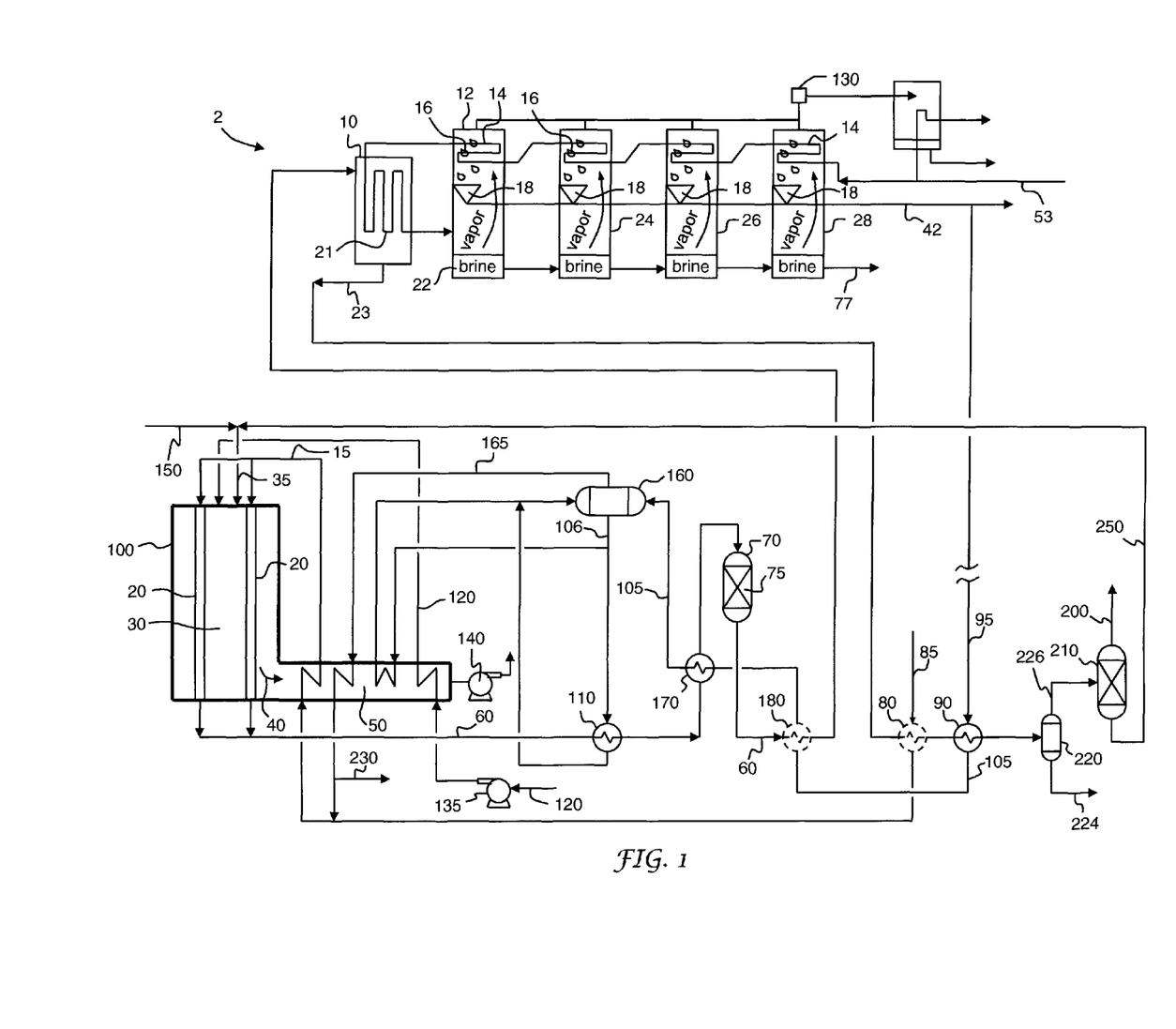
FIG. 1 is a process flow diagram of an integrated steam-hydrocarbon reforming process and multi-stage flash process where raw water is heated by indirect heat transfer with reformate without using a working fluid.
Figure 2:
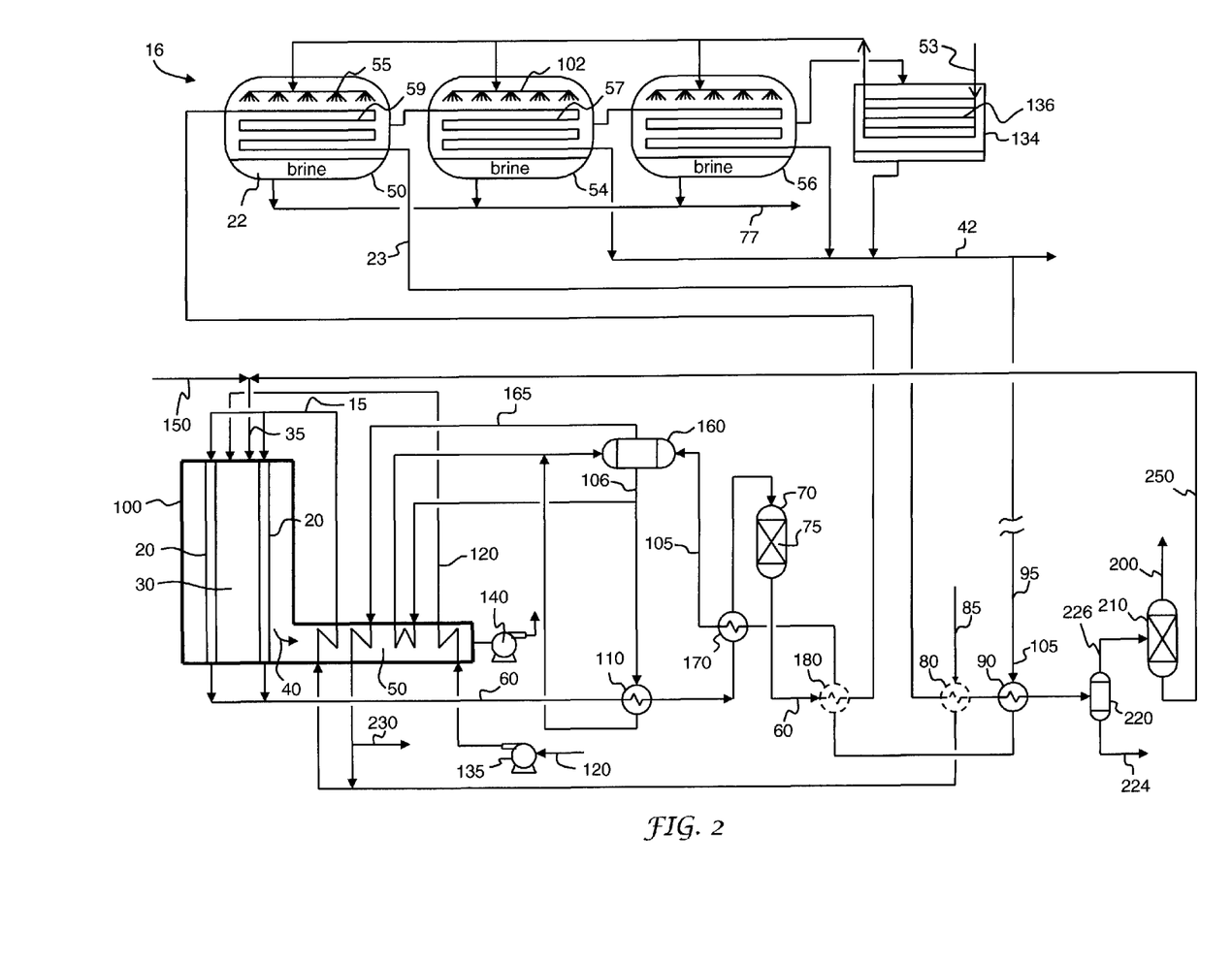
FIG. 2 is a process flow diagram of an integrated steam-hydrocarbon reforming process and multiple effect distillation process where raw water is heated by indirect heat transfer with reformate without using a working fluid.
Figure 3:
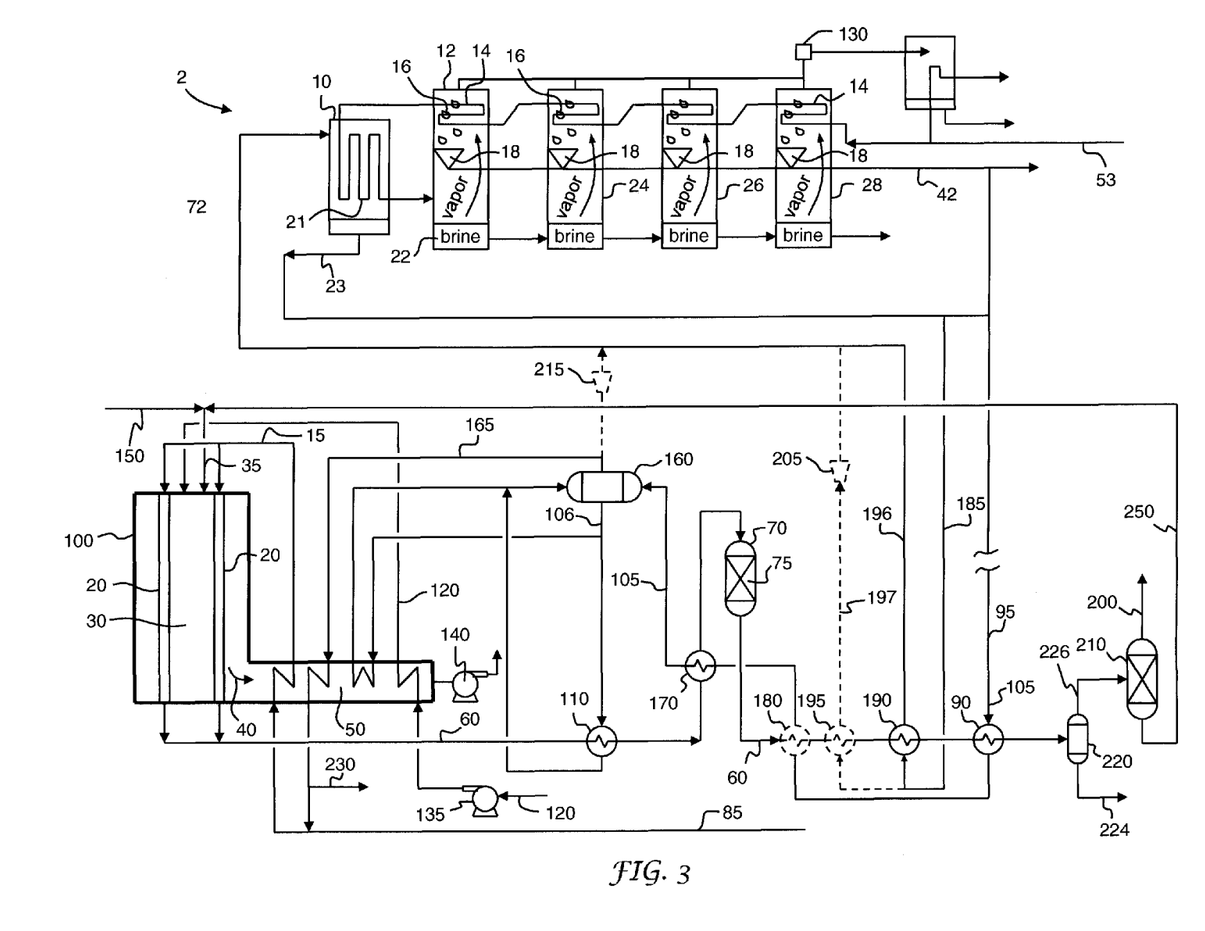
FIG. 3 is a process flow diagram of an integrated steam-hydrocarbon reforming process and multi-stage flash process where raw water is heated by indirect heat transfer with reformate using a working fluid.
Figure 4:
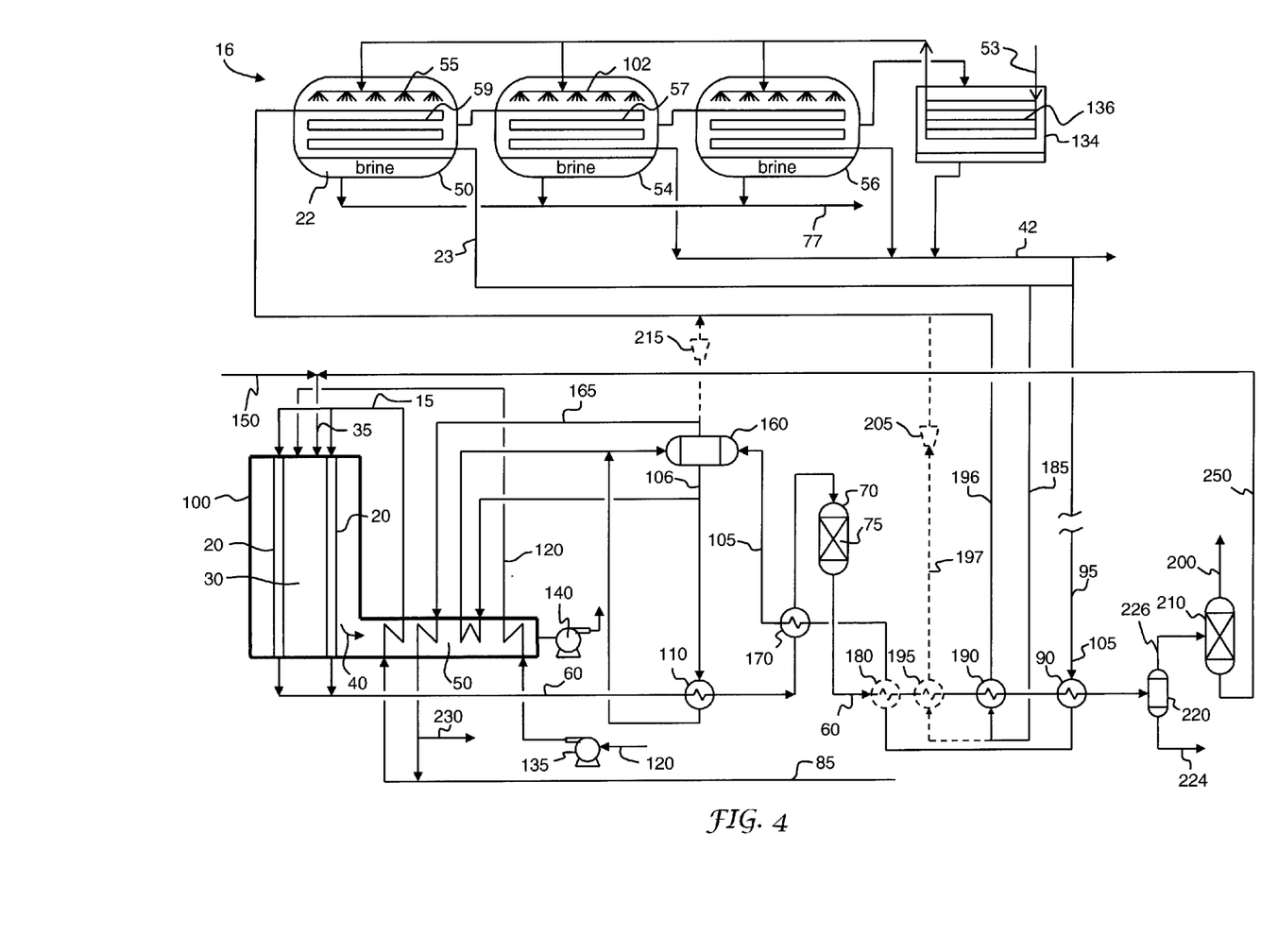
FIG. 4 is a process flow diagram of an integrated steam-hydrocarbon reforming process and multiple effect distillation process where raw water is heated by indirect heat transfer with reformate using a working fluid.

Referring now to the drawings, wherein like reference numbers refer to like elements throughout the several views, FIGS. 1 and 3 show process flow diagrams for various embodiments of a steam-hydrocarbon reforming process integrated with a Multi-Stage Flash (MSF) thermal water purification process for producing a $H_2$-containing product 200 and purified water 42. FIGS. 2 and 4 show process flow diagrams for various embodiments of a steam-hydrocarbon reforming process integrated with a Multiple Effect Distillation (MED) thermal water purification process for producing a $H_2$-containing product 200 and purified water 42.

The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into synthesis gas by reaction with steam over a catalyst. Synthesis gas, commonly called syngas, is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when synthesis gas is generated.

The process comprises introducing a reformer feed gas mixture 15 into a plurality of catalyst-containing reformer tubes 20 in a reformer furnace 100, reacting the reformer feed gas mixture 15 in a reforming reaction under reaction conditions effective to form a reformate 60 comprising $H_2$, CO, $CH_4$, and $H_2O$, and withdrawing the reformate 60 from the plurality of catalyst-containing reformer tubes 20.

The reformer feed gas mixture 15 comprises a hydrocarbon feedstock and steam, or a mixture of prereformed hydrocarbon feedstock and steam. Feedstock may be natural gas, methane, naphtha, propane, refinery fuel gas, refinery off-gas, or other suitable reformer feedstock known in the art.

The reforming reaction takes place in the plurality of catalyst-containing reformer tubes in reformer furnace 100. A reformer furnace, also called a catalytic steam reformer, steam methane reformer, and steam-hydrocarbon reformer, is defined herein as any fired furnace used to convert feedstock containing elemental hydrogen and carbon to synthesis gas by a reaction with steam over a catalyst with heat provided by combustion of a fuel.

Reformer furnaces with a plurality of catalyst-containing reformer tubes, i.e. tubular reformers, are well known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 60 in step (a) include a first temperature ranging from 500° C. to 1000° C. and a first pressure ranging from 203 kPa to 5,066 kPa (absolute).

As used herein, a reformate stream is any stream comprising hydrogen and carbon monoxide formed from the reforming reaction of a hydrocarbon and steam.

The process comprises heating saturated boiler feed water 106 from steam drum 160 by indirect heat transfer with the reformate 60 withdrawn from the plurality of catalyst-containing reformer tubes 20 in a first heat exchanger 110 thereby forming high pressure steam 165 having a pressure ranging from 1.5 to 12.5 MPa (absolute). The reformer feed gas mixture 15 comprises the high pressure steam 165.

As shown in the figures, saturated boiler feed water 106 is withdrawn from steam drum 160 and passed to heat exchanger 110 where the saturated boiler feed water 106 is heated by indirect heat exchange with the reformate 60 in heat exchanger 110. The heated boiler feed water is returned to steam drum 160 where steam and water are separated. Steam 165 is withdrawn from the steam drum and saturated boiler feed water is passed to various heat exchangers to be heated.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

The process comprises heating boiler feed water 105 in a second heat exchanger 170 by indirect heat transfer with reformate 60 from the first heat exchanger 110. As shown in the figures, the boiler feed water 105 is heated in the second heat exchanger 170 before being heated in the first heat exchanger 110.

Boiler feed water is water that meets certain purity requirements for use in boilers and stream drums.

As shown in the figures, the ref ormate 60 is passed from the second heat exchanger 170 to shift reactor 70. The process comprises reacting the reformate 60 from the second heat exchanger 170 in the presence of a shift catalyst 75 under reaction conditions effective to form additional hydrogen in the reformate 60. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 60 include a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 310° C. to 370° C., and an outlet temperature in the range 400° C. to 500° C. is typical. Usually an iron oxide/chromia catalyst is used for high temperature shift.

For low temperature shift, an inlet temperature in the range 190° C. to 230° C., and an outlet temperature in the range 220° C. to 250° C. is typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. is typical. A suitably formulated supported copper catalyst can be used for medium temperature shift. Medium temperature shift may be preferred for the present process.

A combination may include a sequence of high temperature shift, cooling by indirect heat exchange, and low temperature shift. If desired, either shift stage can be subdivided with interbed cooling.

As shown in the figures, the process may further comprise heating the boiler feed water 105 by indirect heat transfer with the reformate 60 from the shift reactor 70 in optional heat exchanger 180 prior to heating the raw water 53 by indirect heat transfer with the reformate 60 from shift reactor 70 wherein the boiler feed water 105 is heated by the reformate from shift reactor 70 before being heated in heat exchanger 170.

In various embodiments, boiler feed water 105 is not heated by reformate 60 leaving the shift reactor and before the reformate is used to heat raw water 53. In conventional catalytic hydrocarbon-reforming processes, omission of heat exchanger 180 will result in increased loss of low level heat to the environment (waste heat) and poor energy efficiency for the system. In the present case, omission of heat exchanger 180 results in more low level heat being transferred from the reformate 60 to the raw water 53 through heat exchanger 190, and does not result in increased waste heat losses. As a result, the temperature of the reformate 60 leaving the heat recovery system (e.g. heat exchanger 90) ranges from about 25° C. to 65° C., which is similar to the temperature leaving a deep heat recovery system in a conventional catalytic steam-hydrocarbon reforming process that includes heat exchanger 180. This embodiment is advantageous when the value of the water is much greater than the value of energy and/or when the demand for high pressure export steam is low or zero.

The process comprises heating raw water 53 by indirect heat transfer with the reformate 60 after undergoing the shift reaction thereby heating the raw water 53 for purification of the raw water in a multi-stage flash process 2 as shown in FIGS. 1 and 3, or a multiple effect distillation process 16 as shown in FIGS. 2 and 4, to produce purified water 42. As the reformate stream gives up heat to the raw water, the reformate stream is cooled. The amount of heat transferred from the reformate 60 to raw water 53 ranges between 115 to 2784 kJ per kg of make-up water 95.

The process further comprises heating make-up water 95 by indirect heat transfer with the reformate in heat exchanger 90 prior to separating the reformate. The temperature of the reformate leaving heat exchanger 90 ranges from about 25° C. to about 65° C. or from about 35° C. to about 55° C.

"Make-up water" is water introduced into the catalytic steam-hydrocarbon reforming process as a feedstock stream. Make-up water can be boiler feed water quality or may need to be further treated to become boiler feed water quality. The amount of make-up water added to the system is the amount required for reaction in the catalytic steam-hydrocarbon reforming process plus the amount required for export steam production. In case excess steam in the reformate, which is condensed in knock-out drum 220 as process condensate 224, is not recycled to the process, the amount of make-up water required is increased by the amount of process condensate.

The make-up water 95 may comprise purified water 42. The make-up water 95 may consist of purified water 42. A portion or all of the purified water 42 produced may be used as make-up water for the reforming process.

The purified water from thermal water purification processes can be boiler feed water quality. Direct use of the purified water will save on water treatment costs at the catalytic steam-hydrocarbon reforming plant. Use of purified water 42 as boiler feed water can pay for itself if the total cost of the purified water is less than the sum of raw water cost plus the capital and operating cost of water treatment and deaeration in the catalytic steam-hydrocarbon reforming plant.

In case the purified water 42 is not boiler feed water quality, the purified water 42 may be treated by methods used for conventional make-up water treatment.

FIG. 1 shows reformate 60 passed to heating chamber 10 of a representative multi-stage flash process 2. Reformate 60 passes over metallic heat transfer coil 21, disposed internally of heating chamber 10 through which raw water 53 flows and is heated and subsequently enters first stage flash tank 12.

Raw water 53 enters heat transfer coil 14 of flash tank chamber 28. Raw water inside coil 14 is heated by heat transfer as water vapor condenses against the heat transfer coil 14. Optionally, for distillation to occur at lower temperatures, either a vacuum pump or steam ejector 130, is connected to any or all of the flash tanks 12, 24, 26, or 28, lowering the internal tank pressure to below atmospheric pressure. The pressure is successively reduced at each stage from flash tank 12 through to flash tank 28.

Purified water condensate produced by this condensation process is collected in collector 18 of flash tank 28 and exits the tank as a stream of purified water 42.

The incoming raw water is heated further as it passes through the heat transfer coils 14 of flash tanks 28, 26, 24, and then 12. Heated raw water exits flash tank 12 and enters the heat transfer coil 21 of heating chamber 10. Reformate enters heating chamber 10 and contacts the heat transfer coil 21 to effect heat transfer to further heat raw water passing internally through the heat transfer coil 21. Cooled reformate produced as a result of this heat transfer exits the heating chamber 10.

Water vapor which condenses upon contact with coil 14 forms a purified water condensate 16 which drips from the coil 14 into receptacle 18 of each flash tank and is collected as purified water 42. Evaporation of the raw water causes the low quality reject water 22 in the bottom of the flash tanks to become increasingly concentrated in impurities. In the case of desalination of salt water, the low quality reject water 22 is brine and the brine in the bottom of the flash tanks becomes increasingly concentrated with salt. Low quality reject water 22 passes to flash tanks 24, 26, and 28, respectively, where the thermal water purification process repeats at progressively lower pressures. Low quality reject water which is concentrated in impurities exits flash tank 28 and is typically discharged.

Alternatively (not shown in the figures), a portion of the low quality reject is withdrawn and joins the raw water 53 as a portion of the feed water to the thermal water purification process. This low quality reject water recycle increases the conversion rate of the raw water into the purified water, also known as the recovery of the raw water. The higher the amount of recycled low quality reject water, the higher the impurity in the feed water to the thermal water purification process. The amount of recycled low quality reject water depends on the allowable impurity level of the feed water to the thermal water purification process.

The cooled reformate may be optionally further cooled by passing through optional heat exchanger 80 to heat hydrocarbon feedstock 85. The process may comprise heating a hydrocarbon feed 85 by indirect heat transfer with the reformate 60 in heat exchanger 80. In various embodiments, hydrocarbon feedstock 85 is not heated by heat exchange with reformate from shift reactor 70 or by heat exchange with reformate after the reformate has heated raw water 53. In conventional catalytic steam-hydrocarbon reforming processes, omission of heat exchanger 80 results in increased loss of low level heat to the environment (waste heat) and poor energy efficiency. In the present case, omission of heat exchanger 80 results in more low level heat being transferred from the reformate 60 to the raw water 53, and does not result in increased waste heat. Even with the omission of heat exchanger 80, the temperature of the reformate 60 leaving heat exchanger 90 ranges from 25° C. to 65° C., similar to that of a conventional catalytic steam-hydrocarbon reforming process with a deep heat recovery system that normally contains heat exchanger 80.

As shown in FIG. 1, the reformate returned from the multistage flash process 2 is further cooled by passing through heat exchanger 90 where make-up water 95 is heated. Make-up water is heated in heat exchanger 90 before being heated in either of optional heat exchanger 180 or heat exchanger 170.

FIG. 2 illustrates an embodiment of the process utilizing a representative multiple effect distillation process 16. FIG. 2 shows reformate 60 passed to heat transfer coil 59 of evaporator 50. Reformate 60 is cooled in heat transfer coil 59 as a result of heat transfer with raw water 53 brought into contact with the exterior of the coil 59, typically by spraying the raw water through spray bar 55. Cooled reformate is withdrawn from coil 59 and may be optionally further cooled by passing through optional heat exchanger 80 to heat hydrocarbon feedstock 85.

As shown in FIG. 2, the reformate returned from the multiple effect distillation process 16 is further cooled by passing through heat exchanger 90 where boiler feed water 105 is heated. Boiler feed water is heated in heat exchanger 90 before being heated in either of optional heat exchanger 180 or heat exchanger 170.

The process further comprises heating the boiler feed water by indirect heat transfer with the reformate in heat exchanger 90 prior to separating the reformate, wherein the boiler feed water is heated by the reformate from the shift reactor before being heated in heat exchanger 170. The temperature of the reformate leaving heat exchanger 90 ranges from about 25° C. to about 65° C. or from about 35° C. to about 55° C.

The raw water which is sprayed through spray bar 55 onto the exterior of the coil 59 of evaporator 50 undergoes evaporation to form water vapor due to heat transfer between the coil 59 heated by the reformate passing internally therethrough. The water vapor so produced passes from evaporator 50 into heat transfer coil 57 disposed internally of second evaporator 54. Raw water 53 is sprayed onto the exterior of heat transfer coil 57 through spray bar 102, and the water vapor inside the coil 57 condenses within the heat transfer coil 57, exits second evaporator 54 and is collected as water condensate 42. Water vapor produced by heat transfer in evaporator 54 passed into evaporator 56 where the process is repeated, and so on for as many evaporators as are present in the system. Water vapor exiting the last evaporator in the series (56 in FIG. 2) is condensed in condenser 134 by contact with heat transfer coil 136 through which cold raw water feed is passed. Purified water condensate so produced is combined with that produced in the previous evaporators and collected. Low quality reject water 22 collected at the bottom of first evaporator 50 is combined with low quality reject water 22 from the other evaporators 54 and 56, where the thermal water purification process continues optionally at progressively lower pressure operating conditions, and later discharged.

The reformate, after cooling in heat exchanger 90 is passed to knock-out drum 220 to remove water formed by condensation of steam, typically called process condensate. Process condensate 224 may be purified and reused, or alternatively discharged from the process. Purified process condensate may be combined with make-up water 95 and heated in heat exchanger 90, optional heat exchanger 180, and/or heat exchanger 170.

The process may comprise feeding the process condensate 224, along with the raw water 53, to the thermal water purification unit to purify the process condensate for reuse.

The process comprises separating the reformate 60 after the reformate heats the raw water 53 to produce the $H_2$-containing product 200 and a by-product gas 250. The reformate may be separated by any known means for separating reformate. As shown in the figures, the reformate 60 may be separated by pressure swing adsorption in pressure swing adsorber 210 to produce the $H_2$-containing product 200 and the by-product gas 250. The by-product gas 250 from a pressure swing adsorber is commonly called a tail gas. Alternatively, the reformate 60 may be cryogenically separated into synthesis gas products in a cold box (not shown).

The process comprises combusting a fuel 35 with an oxidant gas 120 in the reformer furnace 100 external to the plurality of catalyst-containing reformer tubes 20 under conditions effective to combust the fuel 35 to form a combustion product gas 40 and generate heat to supply energy for reacting the reformer feed gas mixture 15 inside the plurality of catalyst-containing reformer tubes 20 and withdrawing a combustion product gas 40 from the reformer furnace 100. Conditions effective to combust the fuel may include a temperature ranging from 600° C. to 1500° C. and a pressure ranging from 99 kPa to 101.3 kPa (absolute).

The fuel 35 may comprise by-product gas 250 from the means for separating the reformate 60, i.e. the pressure swing adsorber 210. The fuel 35 may comprise supplemental fuel 150. The supplemental fuel is often called trim fuel. The supplemental fuel may be natural gas or other suitable fuel.

The fuel 35 and oxidant gas 120 are combusted external to the plurality of catalyst-containing reformer tubes 20 in the combustion section 30, (also called radiant section) of the reformer furnace 100. The combustion product gas 40 is passed from the combustion section 30 to the convection section 50 of the reformer furnace 100. In the convection section 50 of the reformer furnace 100, various streams are heated by the combustion product gas 40. The combustion product gas 40 is withdrawn from the convection section through exhaust fan 140.

As shown in the figures, combustion air 120 is compressed in compressor 135 and may be heated in a heat exchanger in the convection section 50 before being introduced for combustion. Boiler feed water may be withdrawn from steam drum 160, heated in a heat exchanger in the convection section 50 of the reformer furnace 100, and passed back to the steam drum 160 to make steam. Pressure swing adsorber tail gas may be heated in a heat exchanger (not shown) in the convection section 50 before being introduced for combustion.

Steam 165 from the steam drum 160 may be superheated in a heat exchanger in the convection section 50 of the reformer furnace 100. At least a portion of the superheated steam (commonly called process steam) is blended with a hydrocarbon feedstock 85 to form the reformer feed gas mixture 15. A portion of the superheated steam may be exported as export steam 230.

The reformer feed gas mixture 15 may be further heated in a heat exchanger in the convection section 50 of the reformer furnace 100 before being passed to the plurality of catalyst-containing reformer tubes 20.

The superheated steam may be blended with a hydrocarbon feed, heated and passed to a prereformer to reform a portion of the blend. The prereformer may be an adiabatic prereformer. The mixture from the prereformer may be heated in the convection section 50 of the reformer furnace 100 before being passed to the plurality of catalyst-containing reformer tubes as the reformer feed gas mixture 15.

FIGS. 1 and 2 illustrate processes wherein the step of heating raw water does not include heating of an intermediate working fluid. Embodiments where no intermediate working fluid is used provides the advantage of not requiring a low pressure steam and/or medium pressure steam boiler. Eliminating one stage of heat exchange between the reformate and the raw water also increases the heat exchange temperature differences in the remaining heat exchangers, thereby providing advantages in capital cost and improved thermal efficiency.

FIG. 3 is an alternative embodiment of FIG. 1 where like numerals designate like components. FIG. 3 is an embodiment wherein the step of heating raw water includes heating of an intermediate working fluid. The embodiment shown in FIG. 3 operates similarly to the embodiment shown in FIG. 1. Differences are described below.

FIG. 4 is an alternative embodiment of FIG. 2 where like numerals designate like components. FIG. 4 is an embodiment wherein the step of heating raw water includes heating of an intermediate working fluid. The embodiment shown in FIG. 4 operates similarly to the embodiment shown in FIG. 2. Differences are described below.

As shown in FIGS. 3 and 4, the step of heating raw water 53 by indirect heat transfer may comprise heating a working fluid 185 by indirect heat transfer with the reformate 60 in heat exchanger 190, and heating the raw water 53 by indirect heat transfer with the working fluid 185. The working fluid may be water. Water may be evaporated to form a first stream 196 of steam having a pressure ranging from 15.2 kPa to 304 kPa (absolute) or ranging from 20.3 kPa to 132 kPa, when heated by the reformate in heat exchanger 190. The first stream of steam is condensed to form condensate 23 when heating the raw water and returned to heat exchanger 190 be re-evaporated.

The ratio of the mass flow rate of the first stream 196 of steam to the mass flow rate of the make-up water 95 may be greater than 0.05 and less than 1.2. This is a new operating condition that a conventional steam methane reformer has not used and would not use.

As shown in FIGS. 3 and 4, the process may optionally comprise generating steam and expanding the steam in a steam turbine to generate shaft work. In one option, working fluid water is evaporated to form a second stream 197 of steam having a pressure ranging from 280 kPa to 608 kPa or ranging from 304 kPa to 405 kPa. The reformate from the shift reactor 70 heats the second stream 197 of steam prior to heating the first stream 196 of steam. The second stream 197 of steam is expanded to generate shaft work in steam turbine 205 prior to heating the raw water 53. The shaft work may be used in either or both of the reforming process and the thermal water purification process. The expanded steam is condensed to form condensate 23 when heating the raw water 53. In this option, the ratio of the sum of mass flow rates of the first stream 196 and the second stream 197 of steam to the mass flow rate of the make-up water 95 may be greater than 0.05 and less than 1.2. These embodiments are advantageous when the value of the water is much greater than the value of energy and/or when the demand for high pressure export steam is low or zero.

As shown in FIGS. 3 and 4, another option for generating shaft work comprises expanding a portion of the high pressure steam 165 to generate shaft work in steam turbine 215. The shaft work may be used in the reforming process for pumping and compression and/or to generate electric power. Raw water may be heated by indirect heat transfer with the expanded steam thereby heating the raw water for purification thereof in the multiple effect distillation process 16 or the multi-stage flash process 2. Generating shaft work from high pressure steam is not commonly practiced in conventional catalytic steam-hydrocarbon reforming processes because there is often no end use for the expanded steam. Capturing the value of the expanded steam requires using a condensing turbine, at the expense of a large capital expenditure. In the integrated process, the value of the expanded steam is captured as the energy source for thermal water purification without incurring additional capital expense. The integration synergy makes it an attractive practice to generate power in the catalytic steam-hydrocarbon reforming process when the value of electricity is high.

We claim:

1. A process for producing a $H_2$-containing product gas and for producing purified water, the process comprising:
   (a) introducing a reformer feed gas mixture into a plurality of catalyst-containing reformer tubes in a reformer furnace, reacting the reformer feed gas mixture in a reforming reaction under reaction conditions effective to form a reformate comprising $H_2$, CO, $CH_4$, and $H_2O$, and withdrawing the reformate from the plurality of catalyst-containing reformer tubes;
   (b) heating saturated boiler feed water from a steam drum by indirect heat transfer with the reformate withdrawn from the plurality of catalyst-containing reformer tubes in a first heat exchanger thereby forming high pressure steam having a pressure ranging from 1.5 to 12.5 MPa (absolute), wherein the reformer feed gas mixture comprises the high pressure steam;
   (c) heating boiler feed water by indirect heat transfer with the reformate from the first heat exchanger in a second heat exchanger and introducing the heated boiler feed water into the steam drum;
   (d) reacting the reformate from the second heat exchanger in the presence of a shift catalyst under reaction conditions effective to form additional hydrogen in the reformate;
   (e) heating raw water by indirect heat transfer with the reformate from step (d) thereby heating the raw water for purification thereof by a thermal water purification process to produce purified water, and thereby cooling the reformate stream;
   (f) heating make-up water by indirect heat transfer with the reformate from step (e) in a third heat exchanger thereby cooling the reformate to a temperature ranging from 25° C. to 65° C.;
   (g) separating the reformate from step (f) to produce the $H_2$-containing product and a by-product gas; and
   (h) combusting a fuel with an oxidant gas in the reformer furnace external to the plurality of catalyst-containing reformer tubes under conditions effective to combust the fuel to form a combustion product gas and generate heat to supply energy for reacting the reformer feed gas mixture inside the plurality of catalyst-containing reformer tubes, and withdrawing a combustion product gas from the reformer furnace.

2. The process of aspect 1 wherein the raw water comprises salt water, the thermal water purification process is a desalination process, and the purified water is desalinated water.

3. The process of claim 1 wherein the thermal water purification process is one of a multiple effect distillation process and a multi-stage flash process.

4. The process of claim 1 wherein the make-up water comprises the purified water.

5. The process of claim 1 wherein the make-up water consists of the purified water.

6. The process of claim 5 wherein the make-up water consists of the purified water without treating by filtration, demineralization, or deaeration.

7. The process of claim 1 wherein the step of heating raw water by indirect heat transfer comprises:
   heating a working fluid by indirect heat transfer with the reformate from step (d), and heating the raw water by indirect heat transfer with the working fluid.

8. The process of claim 7 wherein the working fluid is water, wherein the working fluid water is evaporated to form a first stream of steam having a pressure ranging from 15.2 kPa to 304 kPa (absolute) when heated by the reformate from step (d), and wherein the first stream of steam is condensed when heating the raw water.

9. The process of claim 8 wherein $0.05<X<1.2$, where X is the ratio of the mass flow rate of the first stream of steam to the mass flow rate of the make-up water.

10. The process of claim 8 wherein:
    the water is evaporated to form a second stream of steam having a pressure ranging from 280 kPa to 608 kPa;
    the reformate from step (d) heats the second stream of steam prior to heating the first stream of steam;
    the second stream of steam is expanded in a steam turbine to generate shaft work prior to heating the raw water; and
    the second stream of steam is condensed when heating the raw water.

11. The process of claim 1 wherein the step of heating raw water does not include heating of an intermediate working fluid.

12. The process of claim 1 wherein the reformate is separated by pressure swing adsorption in the step (g) to produce the $H_2$-containing product and the by-product gas.

13. The process of claim 1 wherein the fuel combusted in step (h) comprises the by-product gas.

14. The process of claim 1 further comprising:
    heating the boiler feed water by indirect heat transfer with the reformate from step (d) prior to heating the raw water by indirect heat transfer with the reformate from step (d) wherein the boiler feed water is heated by the reformate from step (d) before being heated in step (c); and
    heating a hydrocarbon feedstock by indirect heat transfer with the reformate from step (e), wherein the reformer feed gas mixture comprises the hydrocarbon feedstock.

15. The process of claim 1 further comprising:
    expanding a portion of the high pressure steam in a steam turbine to generate shaft work;
    heating the raw water by indirect heat transfer with the expanded steam from the steam turbine thereby heating the raw water for purification thereof in the thermal water purification process.

16. The process of claim 1 wherein the raw water comprises process condensate from a steam methane reforming process.

17. The process of claim 1 wherein the raw water comprises at least one of river water, stream water, lake water, municipal recycled water, industrial recycled water, and groundwater.

* * * * *